US009680915B2

(12) United States Patent
Pradhan et al.

(10) Patent No.: US 9,680,915 B2
(45) Date of Patent: *Jun. 13, 2017

(54) METHODS FOR CLUSTERING NETWORKS BASED ON TOPOLOGY DISCOVERY AND DEVICES THEREOF

(71) Applicant: Infosys Limited, Bangalore (IN)

(72) Inventors: Satyabrata Pradhan, Sundaragarh (IN); Radha Krishna Pisipati, Hyderabad (IN); Kishore Jonna, Proddatur (IN)

(73) Assignee: Infosys Limited, Bangalore (IN)

( * ) Notice: Subject to any disclaimer, the term of this patent is extended or adjusted under 35 U.S.C. 154(b) by 261 days.

This patent is subject to a terminal disclaimer.

(21) Appl. No.: 13/963,696

(22) Filed: Aug. 9, 2013

(65) Prior Publication Data

US 2014/0075002 A1 Mar. 13, 2014

(30) Foreign Application Priority Data

Sep. 12, 2012 (IN) .......................... 3781/CHE/2012

(51) Int. Cl.
*G06F 15/173* (2006.01)
*H04L 29/08* (2006.01)
*G06Q 30/02* (2012.01)
*G06Q 50/00* (2012.01)

(52) U.S. Cl.
CPC ......... *H04L 67/10* (2013.01); *G06Q 30/0255* (2013.01); *G06Q 50/01* (2013.01); *H04L 67/20* (2013.01); *H04L 67/306* (2013.01)

(58) Field of Classification Search
CPC ... H04L 41/12; H04L 67/10; G06F 17/30601; G06F 17/30598; G06Q 50/01
USPC .......................................... 709/223; 370/255
See application file for complete search history.

(56) References Cited

U.S. PATENT DOCUMENTS

| 7,702,685 | B2 | 4/2010 | Shrufi et al. | |
| 7,813,351 | B2 * | 10/2010 | Shriram | H04L 41/147 370/252 |
| 7,856,449 | B1 * | 12/2010 | Martino | G06F 17/3089 707/781 |

(Continued)

OTHER PUBLICATIONS

Wikipedia, "Web 2.0," retrieved at http://en.wikipedia.org/wiki/Web_2.0 on Aug. 8, 2013.

(Continued)

*Primary Examiner* — Imad Hussain
(74) *Attorney, Agent, or Firm* — LeClairRyan, a Professional Corporation

(57) ABSTRACT

A method, non-transitory computer readable medium, and device for clustering a network includes obtaining information regarding a network including relationship information for a plurality of nodes of the network. A weight value for each of a plurality of directly connected pairs of the plurality of nodes is determined, wherein the directly connected pair are identified based on the relationship information. At least one topology score is generated for each of the plurality of nodes. A plurality of clusters is generated using the topology scores and one of the plurality of nodes as a seed node for each of the clusters. At least the seed node used to generate at least a subset of the plurality of clusters is output.

21 Claims, 2 Drawing Sheets

(56) References Cited

U.S. PATENT DOCUMENTS

| | | | | |
|---|---|---|---|---|
| 8,560,605 | B1* | 10/2013 | Gyongyi | G06F 17/30861 |
| | | | | 707/769 |
| 8,781,231 | B1* | 7/2014 | Kumar | G06K 9/6224 |
| | | | | 382/159 |
| 9,338,047 | B1* | 5/2016 | Kunal | G06Q 30/0201 |
| 2004/0215657 | A1* | 10/2004 | Drucker | G06F 17/3002 |
| 2008/0065471 | A1* | 3/2008 | Reynolds | G06Q 10/06 |
| | | | | 705/7.32 |
| 2008/0086551 | A1* | 4/2008 | Moy | G06Q 10/10 |
| | | | | 709/223 |
| 2009/0070490 | A1* | 3/2009 | Dozier | G09B 19/22 |
| | | | | 709/248 |
| 2010/0121849 | A1 | 5/2010 | Goeldi | |
| 2010/0332991 | A1* | 12/2010 | Banerjee | H04L 41/12 |
| | | | | 715/736 |
| 2011/0218846 | A1 | 9/2011 | Fieldman et al. | |
| 2011/0276396 | A1 | 11/2011 | Rathod | |
| 2012/0296905 | A1* | 11/2012 | Tsai | G06F 17/30598 |
| | | | | 707/737 |
| 2012/0317264 | A1* | 12/2012 | Klincewicz | H04L 41/048 |
| | | | | 709/223 |
| 2013/0101221 | A1* | 4/2013 | Fujiki | G06K 9/6284 |
| | | | | 382/195 |
| 2013/0179449 | A1* | 7/2013 | Balcan | G06F 17/30867 |
| | | | | 707/737 |
| 2013/0238600 | A1* | 9/2013 | Kindler | G06F 17/30958 |
| | | | | 707/722 |
| 2013/0268595 | A1* | 10/2013 | Mohan | H04L 51/32 |
| | | | | 709/204 |
| 2015/0370556 | A1* | 12/2015 | Strosaker | G06F 8/75 |
| | | | | 717/123 |

OTHER PUBLICATIONS

Wikipedia, "List of Social Networking Websites," retrieved at [2] http://en.wikipedia.org/wiki/List_of_social_networking_websites on Aug. 8, 2013.

Wikipedia, "List of Virtual Communities With More Than 100 Million Users," retrieved at [3] http://en.wikipedia.org/wiki/List_of_virtual_communities_with_more_than_100_million_users on Aug. 8, 2013.

Facebook, "Newsroom," retrieved at http://www.facebook.com/press/info.php?statistics on Aug. 8, 2013.

Wikipedia, "Twitter," retrieved at [5] http://en.wikipedia.org/wiki/Twitter on Aug. 8, 2013.

Iyengar et al., "Do Friends Influence Purchases in a Social Network?" Harvard Business School Marketing Unit Working Paper No. 09-123, pp. 1-34 (2009).

Christakis et al., "The Collective Dynamics of Smoking in a Large Social Network", New England Journal of Medicine, 358(21):2249-2258 (2008).

Christakis et al., "The Spread of Obesity in a Large Social Network Over 32 Years", The New England Journal of Medicine, 357(4):370-379 (2007).

"Best Job in the World," retrieved at http://www.ourawardentry.com.au/bestjob/ on Aug. 9, 2013.

Hwang et al., "Bridging Centrality: Graph Mining from Element Level to Group Level", Proc. of 14th ACM SIGKDD Conference on Knowledge Discovery and Data Mining (KDD-08), pp. 336-344 (2008).

Liu et al., "Mining Diversity on Networks", Proc. of Database Systems for Advanced Applications (DASFAA 2010), vol. 5981(1):384-398, LNCS, Springer )2010).

Page et al., "The Page Rank Citation Ranking: Bringing order to the web", Technical Report, Stanford University, pp. 1-17 (1998).

Stephenson et al., "Rethinking Centrality: Methods and Examples", Social Networks, Elsevier, vol. 11(1):1-37 (1989).

Wasserman et al., "Social Network Analysis: Methods and Applications", Cambridge: Cambridge University Press, pp. 169-219 (Nov. 1994).

Girvanan et al., "Community Structure in Social and Biological Networks" Proc. Natl. Acad. Sci. USA 99:7821-7826 (2002).

Anthonisse, J.M, "The Rush in a Directed Graph", Technical Report BN 9/71, Stitching Mathematisch Centrum, Amsterdam (Oct. 1971).

Bounova, G.A., "Topological Evolution of Networks; Case Studies in the US Airlines and Language Wikipedias", PhD thesis, Aeronautics and Astronautics, MIT (2009).

Brandes, U., "A Faster Algorithm for Betweenness Centrality", Journal of Mathematical Sociology, vol. 25(1994):163-177 (2001).

Chan et al., "Fast Centrality Approximation in Modular Networks", Proc. of the 1st ACM International Workshop on Complex Networks meet Information and Knowledge Management (CNIKM '09), ACM, pp. 31-38 (2009).

Eppstein et al., "Fast Approximation of Centrality", Journal of Graph Algorithms and Applications, vol. 8(1):39-45 (2004).

Freeman, L.C., "A Set of Measures of Centrality based upon Betweenness", Sociometry, vol. 40(1):35-41 (1977).

Tizghadam et al., "LSP and Back Up Path Setup in MPLS Networks Based on Path Criticality Index", Proc. of IEEE International Conference on Communications (ICC'07), IEEE, pp. 441-448 (2007).

Tizghadam et al., "On Congestion in Mission-Critical Networks", IEEE Infocom 2008 (Apr. 2008).

Okamoto et al., "Ranking of Closeness Centrality for Large-scale Social Networks", Proc. of the 2nd annual international workshop on Frontiers in Algorithmics (FAW 2008), LNCS Springer, vol. 5059, pp. 186-195 (2008).

Kuramochi et al., "Grew-a Scalable Frequent Subgraph Discovery Algorithm", Proc. of IEEE International Conference on Data Mining (ICDM 2004), IEEE Computer Society, pp. 439-442 (2004).

Yan et al., "GSPAN: Graph-based Substructure Pattern Mining", Proc. of International Confernce on Data Mining (ICDM 2011), IEEE Computer Society, pp. 721-724 (2002).

Silva et al., "Structural Correlation Pattern Mining for Large Graphs", Proc. of the Eighth Workshop on Mining and Learning with Graphs (MLG '10), ACM, pp. 119-126 (2010).

Shen et al., "Mobivis: A Visualization System for Exploring Mobile Data", IEEE Pacific Visualization Symposium (PacificVIS '08), pp. 175-182 (2008).

Yiwei et al., "Identification of Important Actors in Edge-Weight Social Networks", International Conference on Service systems and Service Management, pp. 1643-1647 (2006).

Chan et al., Visualization and Clustering of Author Social Networks, in International Conference on Distributed Multimedia Systems Workshop on Visual Languages and Computing in Grand Canyon, Arizona, USA, pp. 30-31 (2007).

Handcock et al., "Model-Based Clustering for Social Networks" J.R. Statist. Soc., 170(Part 2):1-22 (2007).

Firat et al., "Genetic Clustering of Social Networks Using Random Walks" Computational Statistics & Data Analysis, 51 (12):6285-6294 (2007).

Mishra et al., "Clustering Social Networks" in Workshop on Algorithms and Models for the Web-Graph (WAW2007), pp. 56-67 (2007).

Jin et al., "The Structure of Growing Social Networks," Sante Fe Institute, SFI Working Paper: 2001-06-032, pp. 1-9 (2001).

Ahn, "Analysis of Topological Characteristics of Huge Online Social Networking Services," International World Wide Web Conference Committee, Banff, Alberta, Canada, pp. 835-844 (May 8-12, 2007).

* cited by examiner

METHODS FOR CLUSTERING NETWORKS BASED ON TOPOLOGY DISCOVERY AND DEVICES THEREOF

RELATED APPLICATION

This application claims the benefit of Indian Patent Application Filing No. 3781/CHE/2012, filed Sep. 12, 2012, which is hereby incorporated by reference in its entirety.

FIELD

This technology generally relates to methods and devices for clustering weighted networks based on topology discovery and, more particularly, for more effectively identifying key influencers in a network, such as a social network.

BACKGROUND

Many social networks have become very large and widely used and are increasingly leveraged for information, including characteristics of users, such as for placement of advertising for products or services. Social networks uniquely represent relationships and activities among individuals, communities, and organizations and access to social networks is pervasive in many segments of society as well as available on most computing devices. Accordingly, social networks are generally effective platforms for supporting such advertising.

However, methods for clustering, profiling, classifying, and/or modeling social networks, as well as discovering and analyzing topologies represented therein, are often ineffective. For example, current clustering methods for networks do not consider topology discovery or how various topologies describe the nature of communications or message passing among nodes in the networks.

Additionally, current clustering methods consider social networks to be unweighted, thereby assuming equality among each relationship in the network. By considering networks to be unweighted and/or assigning equal weight to each edge connecting network nodes, current methods for clustering social networks ignore the strength of relationships among nodes, which is vital information. Relationship strength information is particularly useful for identifying key influencers, such as for marketing or promotional purposes

SUMMARY

A method for clustering a network includes obtaining, at a network clustering computing device, information regarding a network including relationship information for a plurality of nodes of the network. A weight value for each of a plurality of directly connected pairs of the plurality of nodes is determined, with the network clustering computing device, wherein the directly connected pair are identified based on the relationship information. At least one topology score is generated, with the network clustering computing device, for each of the plurality of nodes. A plurality of clusters is generated, with the network clustering computing device, using the topology scores and one of the plurality of nodes as a seed node for each of the clusters. At least the seed node used to generate at least a subset of the plurality of clusters is output, with the network clustering computing device.

A non-transitory computer readable medium having stored thereon instructions for clustering a network including machine executable code which when executed by at least one processor, causes the processor to perform steps including obtaining information regarding a network including relationship information for a plurality of nodes of the network. A weight value for each of a plurality of directly connected pairs of the plurality of nodes is determined, wherein the directly connected pair are identified based on the relationship information. At least one topology score is generated for each of the plurality of nodes. A plurality of clusters is generated using the topology scores and one of the plurality of nodes as a seed node for each of the clusters. At least the seed node used to generate at least a subset of the plurality of clusters is output.

A network clustering computing device includes one or more processors and a memory coupled to the one or more processors which are configured to execute programmed instructions stored in the memory including obtaining information regarding a network including relationship information for a plurality of nodes of the network. A weight value for each of a plurality of directly connected pairs of the plurality of nodes is determined, wherein the directly connected pair is identified based on the relationship information. At least one topology score is generated for each of the plurality of nodes. A plurality of clusters is generated using the topology scores and one of the plurality of nodes as a seed node for each of the clusters. At least the seed node used to generate at least a subset of the plurality of clusters is output.

This technology provides a number of advantages including providing more effective methods, non-transitory computer readable medium, and devices to cluster networks by analyzing network topologies as well as the strength of relationships among nodes. With this technology, edge weights representing the strength of the relationship of connected nodes can be determined and clusters of a network, as well as key influencer(s) within clusters, can be identified based on topology and one or more selectable clustering parameters.

DETAILED DESCRIPTION

Figure 1:
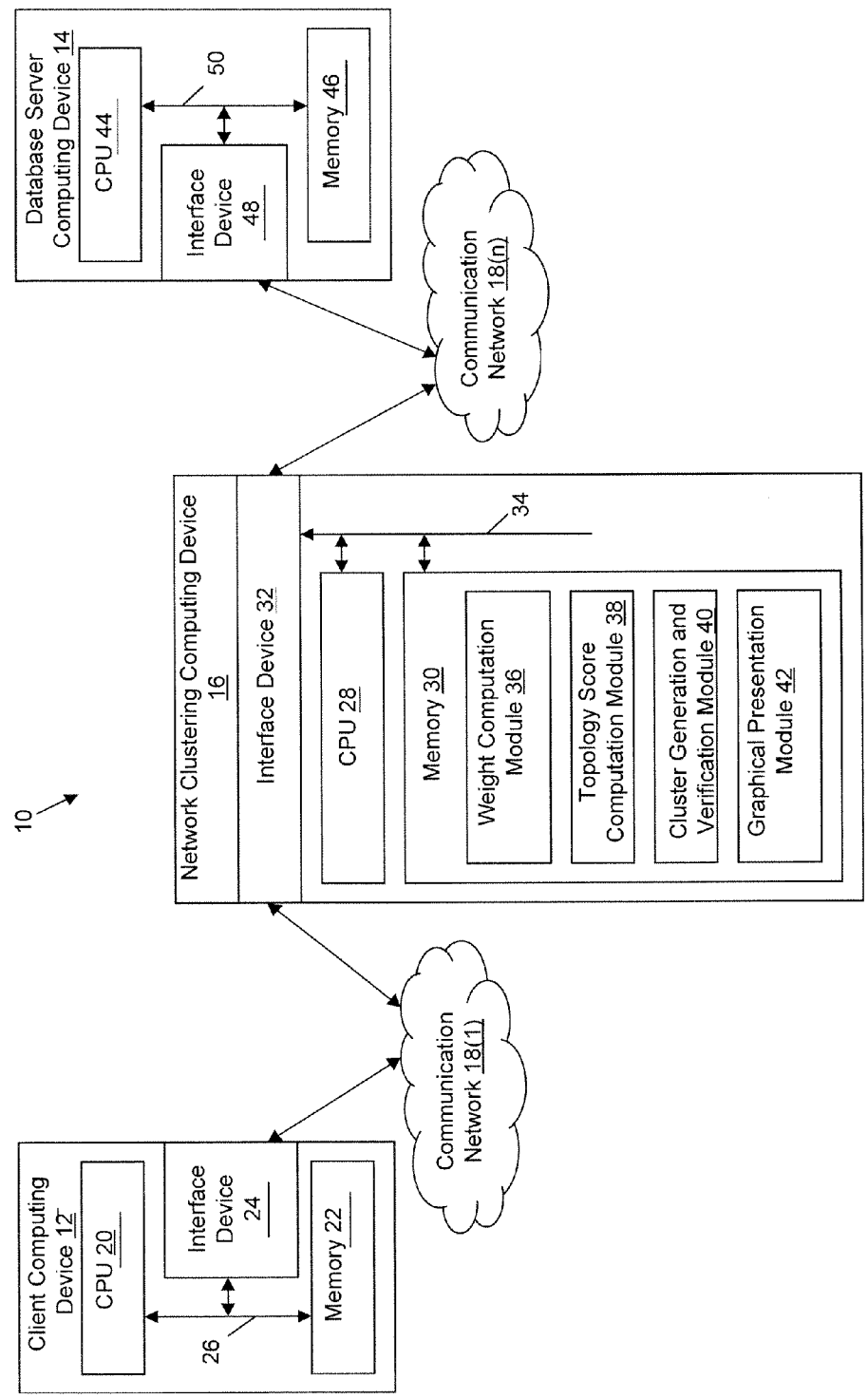
FIG. 1 is an exemplary environment with an exemplary network clustering computing device.

An exemplary environment 10 is illustrated in FIG. 1 as including a client computing device 12, a database server computing device 14, and a network clustering computing device 16 which are coupled together by communications networks 18(1)-18(n), which may include one or more local area networks and/or wide area networks, although other types and numbers of devices and components in other topologies could be used. This technology provides a number of advantages including providing more effective methods, non-transitory computer readable medium, and devices for clustering networks to identify significant nodes, communities, and/or key influencers based on network topology, the strength of relationship among nodes, and one or more selectable clustering parameters.

The client computing device 12 in the environment 10 includes a central processing unit (CPU) 20 including one or more processors, a memory 22, and an interface device 24 or I/O system, which are coupled together by a bus 26 or other link, although other numbers and types of devices, elements, and components in other configurations can be included. The client computing device 12 is coupled to the network clustering computing device 16 by one or more communication networks 18(1) in order to send information to and/or retrieve information from the network clustering computing device 16, for example, although this environment 10 can include other numbers and types of systems, devices, components, and elements in other configurations, such as multiple numbers of each of these devices.

The network clustering computing device 16 includes at least one CPU 28 including one or more processors, a memory 30, and an interface device 32 or I/O system, which are coupled together by a bus 34 or other link, although other numbers and types of systems, devices, components, and elements in other configurations and locations can be used. The CPU 36 in the network clustering computing device 16 executes a program of stored instructions for one or more aspects of the present technology as described and illustrated by way of the examples herein, although other types and numbers of processing devices and logic could be used and the CPU 36 could execute other numbers and types of programmed instructions.

The memory 30 in the network clustering computing device 16 stores these programmed instructions for one or more aspects of the present technology as described and illustrated herein, although some or all of the programmed instructions could be stored and executed elsewhere. A variety of different types of memory storage devices, such as a random access memory (RAM) or a read only memory (ROM) in the device or a floppy disk, hard disk, CD ROM, DVD ROM, or other computer readable medium which is read from and written to by a magnetic, optical, or other reading and writing system that is coupled to the CPU 28, can be used for the memory 30. In some examples, the memory 30 includes a weight computation module 36, a topology score computation module 38, a cluster generation and verification module 40, and/or a graphical presentation module 42 comprising programmed instructions for one or more aspects of the present invention as described and illustrated herein, although the memory 30 can comprise other types and numbers of systems, devices, and elements in other configurations which store other data or modules.

The interface device 32 in the network clustering computing device 16 is configured to operatively couple and communicate between the network clustering computing device 16, the client computing device 12, and the database server computing device 14, using the communication networks 18(1)-18(n). By way of example only, the communications could be based on TCP/IP over Ethernet and industry-standard protocols, including NFS, CIFS, SOAP, XML, LDAP, WBEM, WMI, and SNMP, although other types and numbers of connections, each having their own communications protocols, can be used.

The database server computing device 14 can include a CPU 44 including one or more processors, a memory 46, and an interface device 48 or I/O system, which are coupled together by a bus 50 or other link, although other numbers and types of devices, elements, and components in other configurations can be included. The CPU 44 in the database server computing device 14 may execute a program of stored instructions for one or more aspects of the present technology as described and illustrated herein. The memory 46 in the database server computing device 14 stores these programmed instructions, although some or all of the programmed instructions could be stored and executed elsewhere. The database server computing device 14 can be configured to store network information including relationship information of a plurality of nodes or users of the network, such as a social network by way of example.

It is to be understood that the devices and systems of the examples described herein are for exemplary purposes, as many variations of the specific hardware and software used to implement the examples are possible, as will be appreciated by those skilled in the relevant art(s). Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those ordinary skill in the art.

In addition, two or more computing systems or devices can be substituted for any one of the systems in any embodiment of the examples. Accordingly, principles and advantages of distributed processing, such as redundancy and replication also can be implemented, as desired, to increase the robustness and performance of the devices and systems of the examples. The examples may also be implemented on computer device(s) that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein.

Figure 2:
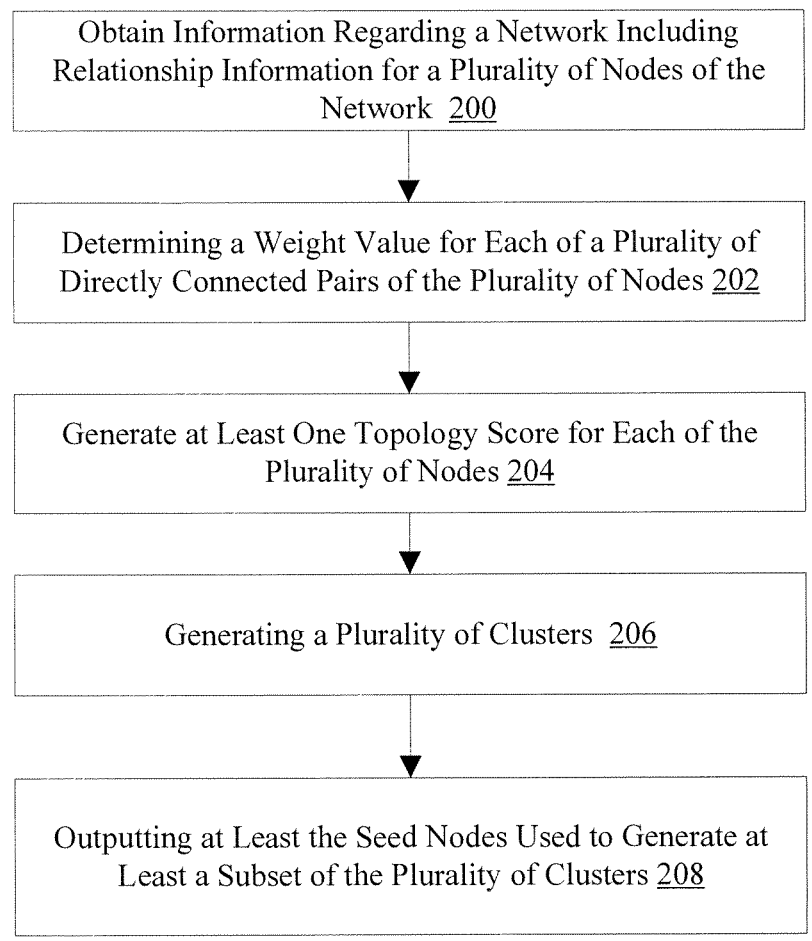
FIG. 2 is a flow chart of an exemplary method for clustering a network.

An exemplary method for clustering a network will now be described with reference to FIGS. 1-2. In step 200, the network clustering computing device 16 obtains information regarding a network including a relationship of a plurality of participants of the network. In one example, the relationship information is stored in a database, such as a database maintained by the database server computing device 14 by way of example only. The relationship information can be extracted by the network clustering computing device 16 directly from the database server computing device 14 or the relationship information can be obtained from a third party. Accordingly, the resulting data set includes a unique identifier for each member of the network, or node, and the relationship of each node to other nodes, if any. In one example, the network is a social network and the relationship information includes, for each member or member profile, an identification of the member's friends, followers, and/or associated or linked profiles, although other types of networks and other types of relationship information can be used.

In step 202, the network clustering computing device 16 executing the weight computation module 36 determines a weight value for each of a plurality of connected pairs of the plurality of nodes. Each weight value corresponds to an edge of the network and each edge connects a pair of nodes. A pair of nodes may be connected based on multiple shared relationships and the weight values represent the strength of the relationship of each pair of connected nodes.

In one example of determining edge weights, a digital bibliography library project (DBLP) database storing information regarding computer science publications is used. In this example, the database includes relationship information of authors of the publications, each of which is represented by a node. Authors can be linked based on co-authoring a paper or authoring a paper including a reference to a paper by another author, although other types of links can be used.

Accordingly, a weight value can be calculated for each edge based in this example on the number of publications in which the two nodes connected by the edge are authors as well as the total number of authors of those publications. Additionally, in this example a weight value can be calculated for each edge based on the number of publications in which the two nodes connected by the edge reference each other in publications in which they each are an author, respectively, as well as the total number of references in those publications. The coauthorship and reference weight values can be combined to form the edge weight values, although other types and numbers of values can be used. Exemplary computations for determining the edge weight values in this exemplary DBLP network are shown below in Table 1.

TABLE 1

Notations:

Let $a_i$ and $a_j$ be two authors.
$W_{ij}$ = the weight of the link between $a_i$ and $a_j$
$w_{ij}^C$ = the weight of the link between $a_i$ and $a_j$ due to coauthorship
$w_{ij}^R$ = the weight of the link between $a_i$ and $a_j$ due to references $$\delta_i^k = \begin{cases} 1 \text{ if } a_i \text{ is an author of paper k} \\ 0 \text{ otherwise} \end{cases}$$

$n_k$ = number of authors of paper k $$r_{ij}^k = \begin{cases} 1 \text{ if } a_i \text{ gives reference to } a_j \text{ in paper k} \\ 0 \text{ otherwise} \end{cases}$$

$R_i^k$ = number of references $a_i$ uses in paper k

Formulas:

$$w_{ij}^C = \sum_k \frac{\delta_i^k \cdot \delta_j^k}{n_k - 1}$$

$$w_{ij}^R = \begin{cases} 0 \text{ if } \sum_k r_{ij}^k = 0 \wedge \sum_l r_{ji}^l = 0 \\ \frac{\left[\left(\sum_k r_{ij}^k\right) + 1\right]\left[\left(\sum_l r_{ji}^l\right) + 1\right]}{\left(\sum_k R_i^k\right)\left(\sum_l R_j^l\right)} \text{ otherwise} \end{cases}$$

$$w_{ij} = w_{ij}^C + w_{ij}^R$$

$$d_{ij} = (\text{link distance}) = \frac{1}{w_{ij}}$$

Optionally, in order to normalize the edge weight values an inverse of the total weight values, referred to herein and in Table 2 as the link distance ($d_{ij}$ or $d_{cv}$) can be calculated and used as described and illustrated below with respect to step 206. Accordingly, the link distance values will be bound between 0 and 1 and smaller link distance values for an edge represent a smaller distance, or relatively strong relationship, of the nodes connected by the edge. The DBLP database and associated network has been used herein for exemplary purposes, although other databases, networks, and edge weight determinations representing the strength of the relationship of the connected nodes can also be used.

In step 204, the network clustering computing device 16 executing the topology score computation module 38 generates at least one topology score for each of the plurality of nodes. Optionally, in order to generate the topology scores, the network clustering computing device 16 executing the topology score computation module 38 first generates at least one value for each of a plurality of centrality parameters for each of the plurality of nodes. The centrality parameters can include one or more of betweenness, closeness, degree, clustering coefficient, or eccentricity, as discussed in more detail below, although other centrality parameters can be utilized including eigenvalue and alpha centrality parameters, for example.

The value of the betweenness centrality parameter (b) for each node of a network is a measure of the number of vertices connecting indirectly to a specified vertex in the network or the extent to which a node lies between other nodes in the network. The betweenness centrality parameter takes into account the connectivity of the node's neighbors, resulting in a higher value for nodes which bridge clusters, communities, and/or groups. The value of the betweenness centrality parameter reflects the number of nodes a node is connecting indirectly through its direct links. Accordingly, the value of the betweenness centrality parameter is increased for nodes that facilitate connectivity among distant nodes of the network. Additionally, a node that resides on many shortest paths when compared to other of the nodes has a higher associated value for the betweenness centrality parameter.

In one example, for a graphical representation of a network G:=(V,E) with n vertices (v) or nodes, the betweenness b(v) for vertex v can be calculated by the following formula: $b(v) = \Sigma_{s \in V, t \in V, s \neq t} (\sigma_{st}(v)/\sigma_{st})$, where $\sigma_{st}$ is the number of shortest paths from s to t, and $\sigma_{st}(v)$ is the number of shortest paths from s to t that pass through vertex v. One exemplary algorithm for determining the value of the betweenness centrality parameter for a plurality of nodes is disclosed in U. Brandes, "A Faster Algorithm for Betweenness Centrality," Journal of Mathematical Sociology, vol. 25 (1994), 2001, pp. 163-177, which is incorporated herein by reference.

The value of the closeness centrality parameter (cl) for each node of a network is a measure of the efficiency of each node in spreading information to all the other nodes which are reachable in the network or the degree a node is directly or indirectly near all other nodes in a network. The value of the closeness centrality parameter for a node reflects the ability of the node to access information through other network members.

In one example, the value of the closeness centrality parameter for each node of a network is determined as the mean geodesic distance, or the shortest path, between a vertex v or node and all other vertices reachable from it: $cl(v) = ((n-1)/\Sigma_{u \in V} d(v,t))$, where d is the size of the network's connectivity component V reachable from v or the cardinality of vertex set V. Exemplary algorithms for determining the value of the closeness centrality parameter for a plurality of nodes are disclosed in S. Y. Chan, I. X. Leung, and P. Li'o, "Fast Centrality Approximation in Modular Networks", Proc. of the 1st ACM International Workshop on Complex Networks meet Information and Knowledge Management (CNIKM '09), ACM, 2009, pp. 31-38 and D. Eppstein and J. Wang, "Fast Approximation of Centrality," Journal of Graph Algorithms and Applications, vol. 8(1), 2004, pp. 39-45, each of which is incorporated herein by reference.

The value of the degree centrality parameter (d) for each node of a network is a measure of the number of connections a node has with its neighbors. Accordingly, in one example, the value of the degree centrality parameter is determined for a node based on the number of nodes in its neighborhood, such as the number of friends or followers of a member of a social network, for example.

The value of the clustering coefficient parameter (cc) for each node of a network is a measure of how close the neighbors of a node are to forming a clique or complete graph or the likelihood that two associates of a node are associates themselves. Accordingly, a relatively high clustering coefficient centrality parameter value indicates that all the neighbors are connected, or nearly connected, by every possible edge between them.

In one example, the clustering coefficient centrality parameter (cc) for a vertex v or node is determined based on the ratio of the total connections between the vertices within its neighborhood, or direct connections, and the maximum number of links that could possibly exist between them: $cc(v)=|\{e_{jk}\}|/k_i(k_i-1)$, where $k_i$ represents the number of immediate neighbors of vertex v, $e_{jk} \in E$, and $v_i$ and $v_j$ are immediate neighbors of vertex v.

The value of the eccentricity centrality parameter (ecc) for each node of a network is a measure of the maximum shortest path length that is possible from a vertex v or node to all its reachable vertices in the network or how far a node is from the node most distant from it in the network. A maximum shortest path of a node n is a shortest path from n to a node reachable from it that has the largest length among all shortest paths from n to its reachable nodes. The value of the eccentricity centrality parameter is of a node n is, therefore, the length of its maximum shortest path(s): $ecc(v)=\max(\sigma_{st})$, where $\sigma_{st}$ is the number of shortest paths from s to t. Accordingly, a lower eccentricity value may indicate a node is relatively spaced apart from other nodes and may have a lower significance or influencing power.

A summary of exemplary computations for the exemplary centrality parameters described herein is shown below in Table 2.

TABLE 2

| Measure | Formulae |
| --- | --- |
| Betweenness | $b(v) = \sum_{s \in V, t \in V, s \neq t} \dfrac{\sigma_{st}(v)}{\sigma_{st}}$ |
| Closeness | $cl(s) = \dfrac{\sum_{t \in V \setminus s} d_{st}}{|V| - 1}$ |
| Degree | $d(s) = |N_s|$ |
| Clustering Coefficient | $cc(s) = \dfrac{2 \cdot E_s}{|N_s|(|N_s| - 1)}$ |
| Eccentricity | $e(s) = \max_{t \in V} d_{st}$ |

Notations:
G = (V, E) is an undirected graph, where V denote a set of vertices and E a set of edges.
$e_{st} \in E$ if there exists an edge between vertices s and t, where s, t ∈ V.
The neighborhood of a vertex s is denoted by $N_s$, where $N_s = \{t : e_{st} \in E\}$.
$E_s$ represents the number of connected pairs among all neighbors of vertex s.
$\sigma_{st}$ represents the number of shortest paths from vertex s to vertex t, whereas $\sigma_{st}(v)$ represents the number of shortest paths from s to t which passes through vertex v.
$d_{st}$ represents the shortest path distance from s to t.

With the centrality parameter values, the network clustering computing device 16 executing the topology score computation module 38 generates at least one topology score for each node which can include a star topology score, a ring topology score, and/or a mesh topology score, although other topology scores can be generated.

In one example, star topology scores are generated for each node based on the following formula: $b \times d \times cl \times (1-cc^2)$, where b, d, cl, and cc are the betweenness, degree, closeness, and clustering coefficient centrality parameter values, respectively. Accordingly, the star topology score is directly proportional to the betweenness centrality parameter value, degree centrality parameter value, closeness centrality parameter value, and one minus the square of the clustering coefficient centrality parameter value, thereby more heavily weighting the clustering coefficient centrality parameter.

In one example, ring topology scores are generated for each node based on the following formula: ring topology scores are generated for each node based on the following formula: $ecc \times cl \times d^2$, where ecc, cl, and d are the eccentricity, closeness, and degree centrality parameter values, respectively. Accordingly, the ring topology score is directly proportional to the eccentricity centrality parameter value, the closeness centrality parameter value, and the square of the degree parameter value, thereby more heavily weighting the degree centrality parameter.

In another example, mesh topology scores are generated for each node based on the following formula: $cc \times d^2 \times cl / ecc^2$, where cc, d, cl, and ecc are the clustering coefficient, degree, closeness, and eccentricity parameter values, respectively. Accordingly, the mesh topology score is directly proportional to the cluster coefficient centrality parameter value and the closeness centrality parameter value and inversely proportional to the eccentricity centrality parameter value.

Optionally, in order to normalize the star, ring, and/or mesh topology scores, a logarithm function can be utilized along with the optional weight values. Also optionally, the generated topology scores can be stored in the memory 30 as associated with each corresponding node. While the topology scores identified above, alone or in combination, are useful in resolving certain queries with respect to a network, other topology scores can also be calculated and/or used to analyze the network.

In step 206, the network clustering computing device 16 executing the cluster generation and verification module 40 generates a plurality of clusters. In order to generate the clusters, the network clustering computing device 16 executing the cluster generation and verification module 40 optionally obtains at least one value for at least one clustering parameter. The clustering parameters can include a maximum distance parameter, an overlapping parameter, and/or a threshold topology score parameter, although other clustering parameters can also be used. The clustering parameter values can be selectable or tunable and obtained as input from a user of the client computing device 12 using communication network 18(1). Alternatively, the clustering parameter values can be default values stored in the memory 30. In yet another alternative, the clustering parameter values can be determined from by the network clustering computing device 16 executing the cluster generation and verification module 40 based on one or more characteristics of the network.

In this example, the distance parameter ($D_c$) represents the maximum allowed distance of the furthest neighbor to node c for purposes of inclusion in a cluster. The overlapping parameter (θ) can be used to generate a minimum required number of overlapping nodes ($R_\theta$) in order for two nodes to be included in the same cluster. $R_\theta$ can be calculated as θ×min(|ne(c)|, |ne(v)|), where ne(c) and ne(v) represent the neighborhood of nodes c and v, respectively. The neighborhood of a node can be the nodes having a link distance, as determined as described and illustrated above, to node c that is less than the value of the $D_c$ clustering parameter. The threshold topology score parameter (T) represents the topology score threshold at which a node will not be used as a seed node to generate a cluster and/or at which a node will not be included in a cluster. The threshold topology scores can be an absolute or percentile value. In one example, as described and illustrated below, $D_c$ is the average distance of node c to all other nodes in the network, θ varies for each iteration, as described in more detail below, within a range of $θ^0-0.3$ to $θ^0+0.3$, where $θ^0$ is the average clustering coefficient of the nodes of the network, and T is the tenth percentile of topology scores, although other clustering parameter values can be used.

With the topology scores and the clustering parameter values the network clustering computing device 16 executing the cluster generation and verification module 40 generates the plurality of clusters using one of the plurality of nodes as a seed node for each of the clusters. Accordingly, the network clustering computing device 16 executing the cluster generation and verification module 40 obtains a selection of the topology score(s) that are to be used to generate the clusters. A selection of star, ring, or mesh topology scores, for example, can be obtained as input from a user of the client computing device 12 using communication network 18(1). The user's selection can be based on whether the user would like to identify significant nodes capable of influencing or motivating a large number of other nodes, significant nodes likely to be influential with an increased number of groups of members, or significant nodes likely to be relatively influential with an increased number of active or fully connected communities or components of the network in which case star, ring, or mesh topology scores, respectively, can be used.

Based on the selection of at least one of the topology scores, the nodes can be ranked by the network clustering computing device 16 executing the cluster generation and verification module 40 based on the values of the selected topology score generated and optionally stored in the memory 30 in step 204. Optionally, the topology scores can be used to determine which nodes of the plurality of nodes are used as seed nodes. Accordingly, in one example, each of the nodes having a topology score in the tenth percentile can be used as a seed node to generate a cluster. Alternatively, all of the nodes can be used as seed nodes.

For each of the seed nodes, the network clustering computing device 16 executing the cluster generation and verification module 40 performs a neighborhood testing and merging procedure to determine whether a plurality of nodes can be accepted as a cluster. In one example of such a procedure, the network clustering computing device 16 executing the cluster generation and verification module 40 adds the seed node to a null set representing a cluster (Cl) and then determines the other nodes (v) that can be added to the set to generate the cluster. To determine whether each of the other nodes belongs in the cluster, the distance of each of the other nodes, or link distance, previously calculated based on the edge weight determination in step 202, is compared to the $D_c$ clustering parameter value. If the link distance for each of the other nodes and the seed node is less than or equal to the $D_c$ clustering parameter value, then the number of overlapping nodes in the neighborhood of each seed node and each other node is determined. If the number of overlapping nodes is greater than or equal to the $R_θ$ parameter value for any of the other nodes, then the other node is added to the set representing the cluster.

Optionally, the other nodes can be filtered such that they are only added to the set representing the cluster if their associated topology score(s) (t(v)) satisfy a condition based on the threshold topology score parameter value. The overlap determination, and optionally the topology score determination, is made for each of the other nodes of the network satisfying the distance condition. When all of the other nodes have been tested, the network clustering computing device 16 executing the cluster generation and verification module 40 accepts or rejects the cluster. The verification of each cluster can be based on whether the number of nodes in the generated cluster is greater than or equal to the degree centrality parameter value for the seed node, indicating the cluster includes at least additional nodes beyond those nodes immediately related to the seed node.

The network clustering computing device 16 executing the cluster generation and verification module 40 performs the procedure described above for each of the seed nodes. Optionally, each of the seed nodes for each of the accepted clusters, and/or each of the nodes includes in each of the sets representing the accepted clusters, can be stored in the memory 30.

An exemplary set of steps performed by the network clustering computing device 16 executing the cluster generation and verification module 40 to generate the plurality of clusters in step 206 is set forth in the below pseudocode, where $D_c$, $R_θ$, T, ne(c), and ne(v) are determined as discussed above, $d_{cv}$ is the shortest distance between nodes c and v, degree(c) or d(c) is equal to the degree clustering coefficient parameter value for node c, and LT1 and T1 are set variables used for comparison purposes in the procedure.

```
1:  Set L to be a list of the nodes sorted in descending order of topology
    score of their topology scores
2:  Tl = ø
3:  for each c ∈ L do
4:      LTl = Tl
5:      if c ∈ Tl then continue
6:      Cl = {c}
7:      Add c to Tl
8:      for each v where d_cv ≤ D_c do
9:          if|ne(c) ∩ ne(v)| ≥ R_θ then do
10:             Add v to Cl
11:             Add v to Tl
12:             if t(v) ≥ T then do
13:                 Add ne(v) to Cl
14:                 Add ne(v) to Tl
15:             end if
16:         end if
17:     end for
18:     if |Tl| − |LTl| > degree(c) then accept Cl as a new cluster
19: end for
```

In step 208, the network clustering computing device 16 executing the graphical presentation module 42 outputs at least the seed nodes used to generate at least a subset of the plurality of clusters. Optionally, the subset of the plurality of clusters includes only those clusters accepted in step 206. The output can be sent by the network clustering computing device 16 executing the graphical presentation module 42 to the client computing device 12 using the communication network 18(1), to the memory 30, or to another storage location from which it can be subsequently retrieved. Optionally, in examples in which the output is sent to the client computing device 12, the output can be in the form of a network graph representing the accepted clusters and identifying the seed or any other relatively significant nodes.

In some examples, a user of the client computing device 12 can input different clustering parameter values and/or indicate a different topology score to the network clustering computing device 16 and at least step 206 can be repeated with the updated values. Thereby, a user of the client computing device 12 can select or tune the clustering parameters and/or the topology score(s) used in step 206 to potentially alter the composition of the accepted clusters.

In another example, steps 206-208 can be repeated by the network clustering computing device 16 executing the cluster generation and verification module 40 for a plurality of values of $\theta$. In this example, an initial value of $\theta$ ($\theta^0$) can be determined as the average clustering coefficient of the nodes of the network and steps 206-208 can be repeated for $\theta$ values within a range of $\theta^0-0.3$ to $\theta^0+0.3$, for example, although other ranges can be used. The number of iterations of steps 206-208 can depend on the number of values of $\theta$ used, such as determined based on a stored increment/decrement value. Optionally, a set of clusters generated in each iteration of step 206 can be output to the memory 30 in each respective iteration of step 208.

In this example, a set of accepted clusters can be output for each iteration and the plurality of sets of clusters can be analyzed, by the network clustering computing device 16 executing the graphical presentation module 42, to generate a score. The plurality of sets of clusters can be analyzed based on any number of parameters such as the value of $\theta$, a cluster count, an uncovered node count, an overlapping node count, and/or a multi-overlapping node count, for example, although other parameters can also be used. The value of the cluster count parameter can be the total number of accepted clusters. The value of the uncovered node count parameter can be the number of nodes included in all of the accepted clusters. The value of the overlapping node count can be the number of nodes that are included in more than one accepted cluster. The value of the multi-overlapping node count parameter can be the ratio of the number of nodes included in more than two accepted clusters to the number of nodes included in more than one accepted clusters.

In some examples, weights can be applied by the network clustering computing device 16 executing the graphical presentation module 42 to the parameters and/or the parameters can be considered as having equal weight. In order to determine the final output, a scoring function can be utilized by the network clustering computing device 16 executing the graphical presentation module 42 to generate a score for each set of accepted clusters based on one or more of the parameter values. In some examples, the score can be directly proportional to the $\theta$ and multi-overlapping node count parameter values and indirectly proportional to the cluster count, uncovered node count, and overlapping node count parameter values. Accordingly, at least the seed nodes for the set of accepted clusters having the highest score can be output by the network clustering computing device 16 executing the graphical presentation module 42.

Accordingly, as illustrated and described with the examples herein, this technology provides more effective methods, non-transitory computer readable medium, and devices for clustering a network to identify one or more significant nodes. With this technology, topology discovery is advantageously performed during clustering. Additionally, edge weights representing the strength of relationships among the nodes are used to filter the nodes added to the generated clusters. This technology also provides selectable or tunable clustering parameters that can be altered by a user. By using the topology scores, edge weight values, and/or clustering parameter values to cluster a network, this technology provides more effective clustering including improved identification of significant nodes.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for optimization of clustering nodes in a network, the method comprising:
   obtaining, by a network clustering computing device, relationship data for a plurality of nodes;
   identifying, by the network clustering computing device, a plurality of node pairs in the plurality of nodes based on the relationship data;
   determining, by the network clustering computing device, a weight value for each of the plurality of node pairs;
   normalizing, by the network clustering computing device, the weight value for each of the plurality of node pairs to determine a link distance value for each of the plurality of node pairs;
   generating, by the network clustering computing device, a topology score for each of the plurality of nodes based on plurality of centrality parameter values for each of the plurality of nodes;
   generating, by the network clustering computing device, a plurality of seed nodes based on the topology score for each of the plurality of nodes;
   generating, by the network clustering computing device, a plurality of clusters based on the plurality of seed nodes, wherein each cluster in the generated plurality of clusters comprises a subset of the plurality of node pairs having the link distance value below a maximum link distance parameter value and topology scores that exceed a threshold topology score parameter value; and
   outputting, by the network clustering computing device, at least the plurality of seed nodes to a server to configure the server to generate at least a subset of the plurality of clusters to selectively communicate with the subset of the plurality of clusters.

2. The method as set forth in claim 1, wherein the weight value comprises a strength relationship of each of the plurality of node pairs based on a number of connections for each node in the plurality of node pairs.

3. The method as set forth in claim 1, wherein the plurality of topology scores comprises a star topology score, a ring topology score, or a mesh topology score.

4. The method as set forth in claim 1, further comprising:
   obtaining, by the network clustering computing device, one or more clustering parameter values for at least one clustering parameter comprising a maximum distance parameter, or an overlapping parameter, wherein the plurality of clusters is further generated based on the one or more clustering parameter values.

5. The method as set forth in claim 1, wherein the outputting further comprises:

generating, by the network clustering computing device, a graphical presentation of the plurality of clusters, wherein the graphical presentation comprises an indication of each of the plurality of seed nodes used to generate the plurality of clusters.

6. The method as set forth in claim 1, further comprising:
determining, by the network clustering device, a distance between each of the plurality of connected nodes, wherein the generating a plurality of clusters is further based on the distance between the plurality of connected nodes.

7. The method as set forth in claim 1, further comprising:
ranking, by the network clustering device, each of the plurality of nodes based on the plurality of topology scores; and
selecting, by the network clustering device, the plurality of seed nodes from the ranked plurality of nodes, based at least in part on the ranking of the plurality of nodes.

8. A non-transitory computer readable medium having stored thereon instructions for optimization of clustering nodes in a network comprising machine executable code which when executed by at least one processor, causes the processor to perform steps comprising:
obtaining relationship data information for a plurality of nodes;
identifying a plurality of node pairs based on the relationship data;
determining a weight value for each of the plurality of node pairs;
normalizing the weight value for each of the plurality of node pairs to determine a link distance value for each of the plurality of node pairs;
generating a topology score for each of the plurality of nodes based on a plurality of centrality parameter values for each of the plurality of nodes;
generating a plurality of seed nodes based on the topology score for each of the plurality of nodes;
generating a plurality of clusters based on the plurality of seed nodes, wherein each cluster in the generated plurality of clusters comprises a subset of the plurality of node pairs having the link distance value below a maximum link distance parameter value and topology scores that exceed a threshold topology score parameter value; and
outputting at least the plurality of seed nodes to a server to configure the server to generate at least a subset of the plurality of clusters to selectively communicate with the subset of the plurality of clusters.

9. The medium as set forth in claim 8, wherein the weight value comprises a strength relationship of each of the plurality of node pairs based on a number of connections for each node in the plurality of node pairs.

10. The medium as set forth in claim 8, wherein the plurality of topology scores comprises a star topology score, a ring topology score, or a mesh topology score.

11. The medium as set forth in claim 8, further having stored thereon instructions which when executed by the at least one processor, causes the processor to perform steps further comprising:
obtaining one or more clustering parameter values for at least one clustering parameter comprising a maximum distance parameter, or an overlapping parameter, wherein the plurality of clusters is further generated based on the one or more clustering parameter values.

12. The medium as set forth in claim 8, wherein the outputting further comprises:

generating a graphical presentation of the plurality of clusters, wherein the graphical presentation comprises an indication of each of the plurality of seed nodes used to generate the plurality of clusters.

13. The medium as set forth in claim 8, further having stored thereon instructions that when executed by the processor cause the processor to perform steps further comprising:
determining a distance between each of the plurality of connected nodes, wherein the generating a plurality of clusters is further based on the distance between the plurality of connected nodes.

14. The medium as set forth in claim 8, further having stored thereon instructions that when executed by the processor cause the processor to perform steps further comprising:
ranking each of the plurality of nodes based on the plurality of topology scores; and
selecting the plurality of seed nodes from the ranked plurality of nodes, based at least in part on the ranking of the plurality of nodes.

15. A network clustering computing device, comprising:
one or more processors; and
a memory coupled to the one or more processors which are configured to be capable of executing programmed instructions, which comprise the programmed instructions stored in the memory to:
obtain relationship data for a plurality of nodes;
identify a plurality of node pairs in the plurality of nodes based on the relationship data;
determine a weight value for each of the plurality of node pairs;
normalize the weight value for each of the plurality of node pairs to determine a link distance value for each of the plurality of node pairs;
generate a topology score for each of the plurality of nodes based on a plurality of centrality parameter values for each of the plurality of nodes;
generate a plurality of seed nodes based on the topology score for each of the plurality of nodes;
generate a plurality of clusters based on the plurality of seed nodes, wherein each cluster in the generated plurality of clusters comprises a subset of the plurality of node pairs having the link distance value below a maximum link distance parameter value and topology scores that exceed a threshold topology score parameter value; and
output at least the plurality of seed nodes to a server to configure the server to generate at least a subset of the plurality of clusters to selectively communicate with the subset of the plurality of clusters.

16. The device as set forth in claim 15, wherein the weight value comprises a strength relationship of each of the plurality of node pairs based on a number of connections for each node in the plurality of node pairs.

17. The device as set forth in claim 15, wherein the plurality of topology scores comprises a star topology score, a ring topology score, or a mesh topology score.

18. The device as set forth in claim 15, wherein the one or more processors are further configured to be capable of executing programmed instructions, which comprise the programmed instructions stored in the memory to:
obtain one or more clustering parameter values for at least one clustering parameter comprising a maximum distance parameter, or an overlapping parameter, wherein the plurality of clusters is further generated based on the one or more clustering parameter values.

19. The device as set forth in claim 15, wherein the outputting further comprises generating a graphical presentation of the plurality of clusters, wherein the graphical presentation comprises an indication of each of the plurality of seed nodes used to generate the plurality of clusters.

20. The device as set forth in claim 15, wherein the one or more processors are further configured to be capable of executing programmed instructions, which comprise the programmed instructions stored in the memory to:
  determine a distance between each of the plurality of connected nodes, wherein the generating a plurality of clusters is further based on the distance between the plurality of connected nodes.

21. The device as set forth in claim 15, wherein the one or more processors are further configured to be capable of executing programmed instructions, which comprise the programmed instructions stored in the memory to:
  rank each of the plurality of nodes based on the plurality of topology scores; and
  select the plurality of seed nodes from the ranked plurality of nodes, based at least in part on the ranking of the plurality of nodes.

\* \* \* \* \*